Sept. 28, 1965 M. L. LIVINGSTON 3,209,355

DUAL OPERATING MODE CIRCUIT

Filed Dec. 20, 1962 2 Sheets-Sheet 1

INVENTOR.
MARVIN L. LIVINGSTON
BY Hurvitz & Rose
ATTORNEYS

DUAL OPERATING MODE CIRCUIT

Filed Dec. 20, 1962 2 Sheets-Sheet 2

INVENTOR
MARVIN L. LIVINGSTON

BY Harvitz & Rose

ATTORNEYS

3,209,355
DUAL OPERATING MODE CIRCUIT

Marvin Lee Livingston, Palm Bay, Fla., assignor to Radiation Incorporated, Melbourne, Fla., a corporation of Florida Filed Dec. 20, 1962, Ser. No. 246,085
21 Claims. (Cl. 343—100)

The present invention relates to a dual mode signalling system and more particularly to a system having a plurality of distinct polarization modes, at least one of which is scanned.

I have found that a monopulse antenna system can be simultaneously utilized for dual purposes by propagating oppositely polarized waves from it. For example, it is possible with a single antenna system to provide conical scan for generating a tracking error signal while simultaneously propagating command signals to the target, such as a missile, or receiving conventional data signals with full antenna gain and no scan modulation. This dual capability is achieved with a considerable monetary saving over prior techniques because a single monopulse antenna system performs the same function formerly accomplished by a pair of such systems.

In the device of the present invention, a pair of orthogonal driven elements is provided for each of the array elements of a monopulse antenna system. The elements are driven so that oppositely polarized waves (circular right and left or linear vertical and horizontal) are derived from each. Thus the antenna system provides two polarization channels of the opposite sense from each array element. The function of the present invention is to modify and combine these array element modes in order to provide various dual mode operations.

To provide conical scan, the antenna system includes at least three and preferably four orthogonal array elements. Conical scanning is accomplished by synchronously changing the relative phase of the individual array elements with variable phase shifters prior to combining them in a conventional monopulse summation. The transmitted waves from a target in space incident on the antenna generate a signal in each array element. The signals from one polarization channel are continuously and synchronously phase shifted a fixed degree relative to each other. The phase shifted signals are combined to derive a sum signal modulated in accordance with the scanning function introduced by the phase shifts.

While scan information is being derived in one of the polarization channels the other polarization channel is being utilized simultaneously to derive conventional monopulse summation information. This is accomplished by combining the signals of each of the array elements for that polarization channel by conventional monopulse techniques to provide a full gain, non-scan, monopulse summation signal. In the alternative, the second mode can be utilized exclusively for command signal transmission purposes to the remote target.

The present invention also is capable of being utilized for dual conical scan tracking, a recently developed process which minimizes, or eliminates, tracking errors due to spurious amplitude modulation. It is a process whereby a conically scanned tracking antenna system includes two orthogonal polarization channels of opposite sense, both of which are either circular or linear. These polarization channels are modulated 180° out of phase with respect to each other so that a pair of summation signals in phase opposition are derived in response to an incident signal. This process minimizes, or eliminates, tracking errors caused by common amplitude modulation components introduced into the received signal by propagation effects and gyrations of the target source.

In the present invention, dual conical scanning is achieved by synchronously varying the relative phase of the individual antenna array elements on both polarizations. The phase shifters are arranged so that equal and opposite phase variations are continuously and synchronously introduced on the two signals derived from the same array element. By combining the modulated summation signals from both polarization channels in a dual channel receiver, errors introduced by amplitude modulation components common to both channels are minimized or eliminated.

It is, accordingly, an object of the present invention to provide a new and improved dual mode signalling system.

Another object of the present invention is to provide a signalling system capable of providing scanning information while simultaneously performing an additional function.

A further object of the present invention is to provide a new and improved dual concial scan tracking system.

An additional object of the present invention is to provide a dual mode signalling device requiring a single antenna system even though the device simultaneously performs two functions.

A still further object is to provide a device which generates a modulated signal for tracking purposes on one polarization channel and simultaneously provides an unmodulated orthogonal channel with full system gain.

Yet an additional object of the present invention is to provide a dual mode signalling system employing oppositely polarized waves in the two signal channels.

The above and still further objects, features and advantages of the present invention will become apparent upon consideration of the following detailed description of one specific embodiment thereof, especially when taken in conjunction with the accompanying drawings, wherein.

Figure 1:
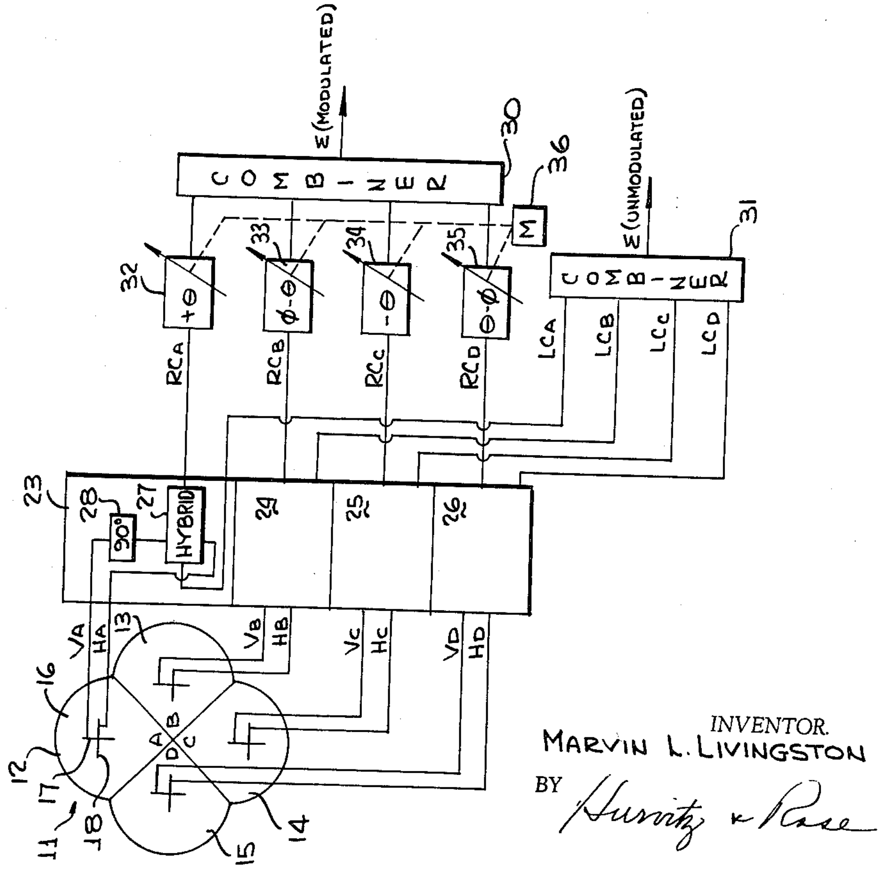
FIGURE 1 is a block diagram of a preferred embodiment of the present invention utilizing circular polarizations.

Reference is now made to FIGURE 1 of the drawings wherein the reference numeral 11 denotes a monopulse antenna system including mutually orthogonal antenna array elements 12–15 which illuminate the same spatial area. Each of the array elements 12–15 includes a parabolic reflector 16 and a plurality of vertically and horizontally polarized active feed elements 17 and 18. Each of the active feed elements is preferably of the wide band type, e.g., a log-periodic antenna, and the entire antenna system 11 may be similar to that disclosed in the copending application of Lavergne E. Williams, Serial No. 176,558, filed March 1, 1962, now Patent No. 3,147,479, which has the same assignee as the present invention.

To derive a circular polarization from each of the arrays 12–15, vertical elements 17 are fed in phase quadrature with horizontal elements 18. This is accomplished through use of polarization transducers 23–26.

Since each of the transducers 23–26 is identical a description of one suffices for all. Transducer 23 includes a conventional four port hybrid 27 and a 90 degree phase shifter 28. The input arms of hybrid 27 are coupled to vertical and horizontal elements 17 and 18, the former coupling being effected through phase shifter 28. Thereby, two opposite senses of circular polarization are simultaneously derived on the output arms of hybrid 27. In an identical manner, transducers 24–26 are coupled to the feed elements of array elements 13–15, respectively, so that opposite senses of circular polarization are derived from all of the array elements.

For simplicity of representation, script letters RC and

LC denote the right and left polarization senses of the signals derived from transducers 23–26. The subscripts A, B, C, D are respectively associated with antenna array elements 12–16.

An incident signal from a source (either active or passive) in the far field of antenna system 11 induces voltages in the vertical and horizontal feed elements 17 and 18 of each of the array elements 12–15. In response to these voltages, the four vertically ($V_A$, $V_B$, $V_C$, and $V_D$) and four horizontally ($H_A$, $H_B$, $H_C$, and $H_D$) polarized signals from each of the array elements 12–15 are combined in their respective polarization transducers 23–26 to produce simultaneous right ($RC_A$, $RC_B$, $RC_C$, and $RC_D$) and left ($LC_A$, $LC_B$, $LC_C$, and $LC_D$) circular outputs. It is to be understood that the left and right polarizations may be of differing frequencies, $f_1$ and $f_2$, so that the right circular outputs, RC, are of frequency $f_1$ while the left circular outputs, LC, are of frequency $f_2$. The only requirement as to the frequency separation of $f_1$ and $f_2$ is that both be similarly affected by the phase shifters of the equipment.

The four right circular outputs are fed into a conventional monopulse hybrid combiner 30 through four ganged variable phase shifters 32–35. The phase shifters 32–35 are designed to introduce a differential phase shift on the right circular RC channel among the individual array elements 12–15. As the phase shifters are varied the right circular sum channel beam of antenna system 11 is conically scanned around the boresight axis. Phase shifters 32–35 are continuously and synchronously varied by motor 36 to derive a modulated sum signal $$RC_A\angle+\theta+RC_B\angle\phi-\theta+RC_C\angle-\theta+RC_D\angle\theta-\phi$$

at the sum (Σ) channel output of combiner 30 which represents the conical scanned right circular pattern of antenna system 11. Combiner 30, of course, is responsive only to the right circular polarization of system 11 because of the connections between feed elements 17 and 18 and their respective polarization transducers 23–26. The crossover angle and null depth of the conically scanned sum pattern of system 11, and hence the amplitude of modulation of the output signal of combiner 30, are controlled by the amount of differential phase shift.

Each of the phase shifters 32–35 is capable of being varied $\pm\phi$ degrees from its zero phase shift position, with the value of $\phi$ being established by the required amplitude of modulation or extent of scan. With no phase modulation introduced by motor 36, i.e., with the motor shaft at its central position, phase shifters 32 and 34 have no effect on the phase of the signal coupled to them while phase shifters 33 and 35 shift their input signals $+\phi$ and $-\phi$, respectively. As the shaft of motor 36 rotates phase shifters 32 and 35 are continuously and synchronously varied in a first direction, $+\phi$, while phase shifters 33 and 34 are synchronously varied in the opposite direction $-\theta$, with the extent of phase shift introduced equal to $\pm\theta$. Thereby, as phase shifter 32 goes from zero to $+\phi$, phase shifter 33 goes from $+\phi$ to zero, phase shifter 34 goes from zero to $-\phi$, and phase shifter 35 goes from $-\phi$ to zero. When phase shifter 32 goes in the opposite direction, from zero to $-\phi$, the remaining phase shifters are correspondingly varied in a synchronous manner.

Simultaneously with the generation of the modulated sum signal, left circular polarization signals are being coupled from the other arm of the hybrids within transducers 23–26 to the inputs of hybrid combiner 31. The outputs of transducers 23–26 are directly added together so that combiner 31 derives a conventional monopulse sum output which is unmodified by any scanning action. Thereby, while combiner 30 provides a scanned output for use in target acquisition or tracking, for example, telemetry data or other target information is being obtained simultaneously from combiner 31 with full system gain and no interfering scan modulation. Also the output of combiner 31 may be used to transmit command signals from the remote source without scan modulation while tracking information is being obtained from combiner 30.

Figure 2:
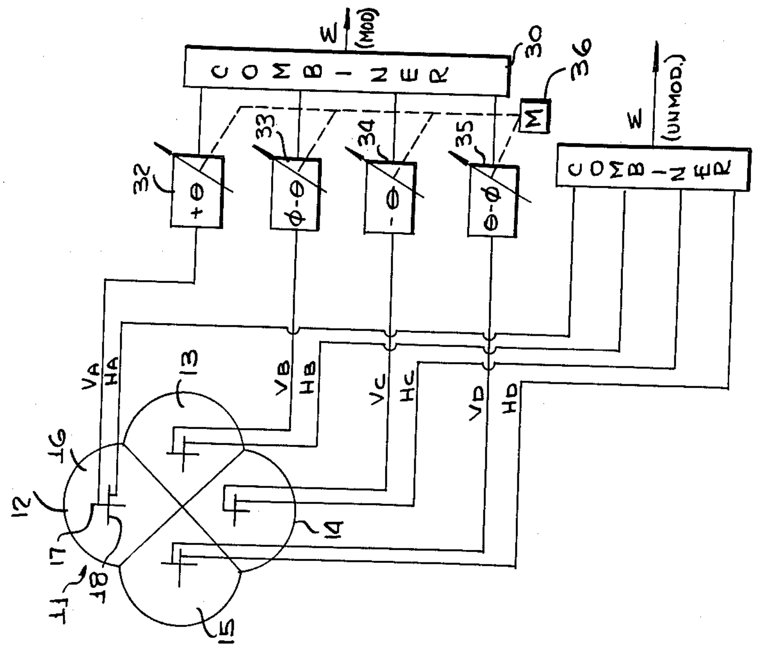
FIGURE 2 is a modification of the embodiment of FIGURE 1, utilizing linear polarizations.

It is to be understood that the invention is not limited to circular polarizations but that linear vertical and horizontal polarizations may be employed as well. This is accomplished by coupling the outputs of vertical feed elements 17 directly to combiner 30 and those of horizontal feed elements 18 to combiner 31, as shown in FIGURE 2. Thus if vertical and horizontal polarizations are desired, transducers 23–26 of FIGURE 1 are completely eliminated. As in FIGURE 1, the two distinct polarizations may be of different frequency, i.e. the vertical mode driving elements 17 may be at frequency $f_1$ and the horizontal mode driving elements 18 may be at frequency $f_2$.

Figure 3:
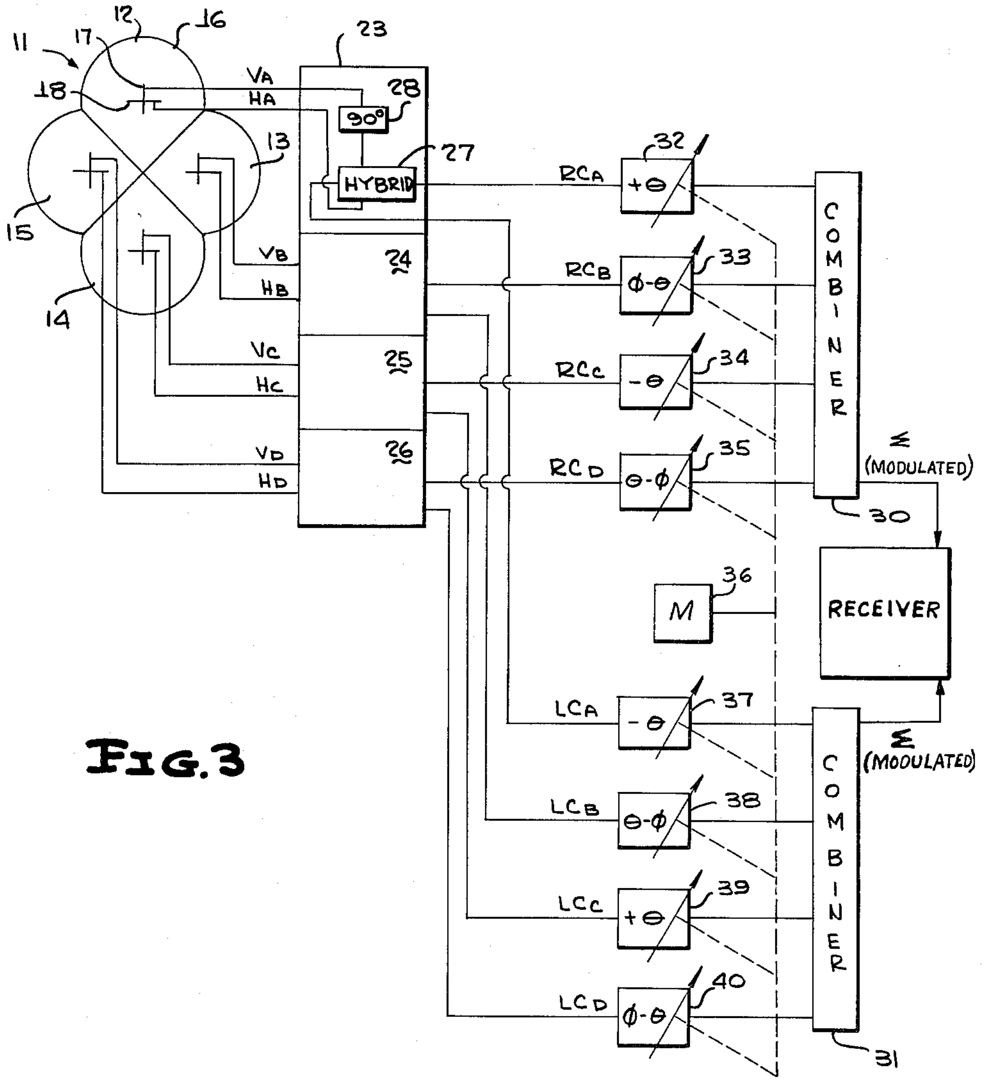
FIGURE 3 is a modification of FIGURE 1 by which dual conical scan tracking is achieved.

Reference is now made to FIGURE 3 of the drawings which discloses a circularly polarized dual conical scan tracking system embodying the teachings of the present invention. Polarization transducers 23–26 are interconnected with antenna array elements 12–15 in exactly the same manner as they are connected in the conical scan system of FIGURE 1. Also, $RC_A\angle\theta$, $RC_B\angle\phi-\theta$, $RC_C\angle-\theta$, and $RC_D\angle\theta-\phi$ input signals are fed to combiner 30 exactly as in FIGURE 1. The left circular LC inputs to combiner 31, however, are modified by variable phase shifters 37–40, respectively.

Phase shifters 37–40 are synchronously driven with phase shifters 32–35 so that the phase shift introduced into the left circular signals is equal, but opposite at any instant, to that introduced into the right circular signals. Thus, the phase shifters cause the conical scan summation outputs of combiners 30 and 31:

$$\Sigma=RC_A\angle\theta+RC_B\angle\phi-\theta+RC_C\angle-\theta+RC_D\angle\theta-\phi$$

and $$\Sigma=LC_A\angle-\theta+LC_B\angle\theta-\phi+LC_C\angle\theta+LC_D\angle\phi-\theta$$

to be 180 degrees out of phase.

By subtracting the modulated summation output signals of both combiners 30 and 31 in an appropriate two channel receiver, tracking errors due to spurious amplitude modulation are minimized or eliminated. This is because any amplitude modulation caused by gyrations of the target, propagation effects, etc., is in phase at the outputs of combiners 30 and 31 and, therefore, cancels in the subtraction process in the receiver. Conical scan tracking information, however, is retained since the scan modulation at the combiner outputs is in phase opposition and therefore is actually summed in the subtraction process of the receiver.

While I have described and illustrated one specific embodiment of my invention, it will be clear that variations of the details of construction which are specifically illustrated and described may be resorted to without departing from the true spirit and scope of the invention as defined in the appended claims.

I claim:

1. A dual mode signalling system comprising a plurality of antenna arrays illuminating the same spatial area, said arrays being driven in two distinct polarization modes, and means for scanning the patterns of said modes synchronously and in opposite phase relations.

2. The system of claim 1 wherein said modes are of different frequencies.

3. A dual mode signalling system comprising a pair of antenna arrays illuminating the same spatial area, said arrays being driven in two distinct polarization modes, and means for scanning the pattern of one of said modes, said last named means including; means for deriving separate signals from each of said arrays for said one mode, means for continuously shifting the phase of each of said signals relative to the other, and means for combining the phase shifted signals with each other signal.

4. The system of claim 3 including means for deriving separate second signals from each of said arrays for said other mode, and means for combining said second signals.

5. A dual mode signalling system comprising a pair of antenna arrays illuminating the same spatial area, said arrays being driven in two distinct polarization modes, and means for scanning the patterns of said modes synchronously and in opposite phase relations, said last named means including; means for deriving separate first signals from each of said arrays for one of said modes, means for continuously shifting the phase of said first signals relative to each other, means for combining the first signals with each other after they have been relatively shifted in phase, means for deriving separate second signals from each of said arrays for said other mode, means for continuously shifting the phase of said second signals relative to each other, and means for combining the second signals after they have been relatively shifted in phase.

6. A dual mode signalling system comprising a single antenna system having a plurality of linear orthogonally driven antenna arrays, each of said arrays having a predetermined bandwidth, and illuminating the same spatial area, said arrays being simultaneously driven in a first polarization mode at a frequency $f_1$ within said bandwidth and in a second polarization mode different than said first mode at a frequency $f_2$ within said bandwidth, and means for scanning one of said modes independently of the operation of the other of said modes and in any arbitrary phase relationship to the other of said modes whereby said signaling system may simultaneously perform two separate functions.

7. The system of claim 6 wherein $f_1$ equals $f_2$.

8. The system of claim 6 wherein $f_1$ and $f_2$ are different.

9. A dual mode signalling system comprising a plurality of antenna arrays, each of said arrays having a predetermined bandwidth, and illuminating the same spatial area, said arrays being driven in a first polarization mode at a frequency $f_1$ within said bandwidth and in a second polarization mode different than said first mode at a frequency $f_2$ within said bandwidth, and means for scanning at least one of said modes wherein said first and second modes are both circular and of opposite sense.

10. The system of claim 6 wherein said first and second modes are both linear and orthogonal to each other.

11. A dual mode signalling system comprising a plurality of antenna arrays illuminating the same spatial area, said arrays being driven in a multiplicity of distinct polarization modes, and means for scanning the pattern of at least one of said modes said last named means including; means for deriving separate signals from each of said arrays for said one mode, means for continuously shifting the phase of each of said signals relative to the other, and means for combining the phase shifted signals with each other signal.

12. A dual mode signalling system comprising four orthogonally arranged antenna arrays illuminating the same spatial area, said arrays being driven in two distinct polarization modes, and means for conically scanning one of said modes.

13. The system of claim 12 wherein said means for scanning includes means for deriving separate signals from each of said arrays for said one mode, means for continuously shifting the relative phase of the signals derived from each of said arrays, and means for combining the signals for all four arrays after they have been relatively shifted in phase.

14. The system of claim 12 wherein the frequencies of said modes are different, and further including means for conically scanning the other of said modes in a direction opposite to said one mode.

15. The system of claim 14 wherein said means for scanning the first mode includes; means for deriving first separate signals from each of said arrays for said one mode, means for continuously shifting the relative phase of the first signals derived from each of said arrays, and means for combining the first signals of all four arrays after they have been relatively shifted in phase; wherein said means for scanning the second mode includes; means for deriving second separate signals from each of said arrays for said second mode, means for continuously shifting the relative phase of the second signals derived from each of said arrays, and means for combining the second signals of all four arrays after they have been relatively shifted in phase; wherein the phases of said first and second phase shifted signals derived from the same array are equal and opposite to each other.

16. A dual mode signalling system comprising four orthogonally arranged antenna arrays illuminating the same spatial area, said arrays being driven in two distinct polarization modes, means for electro-mechanically modulating the pattern of one of said modes and means simultaneously providing an unmodulated orthogonal channel for the other of said modes having the full system gain.

17. A dual mode signalling system comprising a single monopulse antenna system having a plurality of orthogonally driven antenna arrays illuminating the same spatial area, said arrays being simultaneously driven in two distinct polarization modes, and means for scanning the pattern of one of said modes independently of the operation of the other of said modes and in any arbitrary phase relationship with the other of said modes.

18. The system of claim 1 further including means for deriving signals in response to said scanned patterns, and means for comparing the amplitudes of said signals.

19. The system of claim 17 wherein each of said arrays comprises a plurality of vertically and horizontally polarized feed elements.

20. The system of claim 19 wherein each of said feed elements is electrically connected to a polarization transducer having a plurality of output means for each of said two distinct polarization modes, a plurality of phase shifters, said plurality of output means for one of said modes each being electrically connected to one of said phase shifters, and the output of each of said phase shifters being electrically connected to a first combiner.

21. The system of claim 20 wherein said plurality of output means for the other of said modes are each electrically connected to a second combiner.

References Cited by the Examiner

UNITED STATES PATENTS

| | | | |
|---|---|---|---|
| 2,653,238 | 9/53 | Bainbridge | 343—100 X |
| 2,953,781 | 9/60 | Donnellan et al. | 343—100 |
| 2,991,473 | 7/61 | Van Staaden | 343—100 X |

CHESTER L. JUSTUS, *Primary Examiner.*